(12) United States Patent
Wakiyama et al.

(10) Patent No.: US 7,899,792 B2
(45) Date of Patent: Mar. 1, 2011

(54) DATA-MISMATCH RESOLVING APPARATUS, DATA-MISMATCH RESOLVING METHOD, AND COMPUTER PRODUCT

(75) Inventors: Katsushi Wakiyama, Kawasaki (JP); Takahiro Arakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1081 days.

(21) Appl. No.: 11/523,682

(22) Filed: Sep. 19, 2006

(65) Prior Publication Data

US 2007/0283341 A1    Dec. 6, 2007

(30) Foreign Application Priority Data

May 31, 2006   (JP) ............................. 2006-152897

(51) Int. Cl.
*G06F 17/00* (2006.01)
*G06F 7/00* (2006.01)
(52) U.S. Cl. ...................... 707/655; 707/674; 707/690; 707/694
(58) Field of Classification Search ........................ None
See application file for complete search history.

(56) References Cited

U.S. PATENT DOCUMENTS

| 5,873,086 | A * | 2/1999 | Fujii et al. | 707/10 |
| 6,195,761 | B1 * | 2/2001 | Kedem | 714/6 |
| 6,236,993 | B1 * | 5/2001 | Fanberg | 707/690 |

FOREIGN PATENT DOCUMENTS

JP    7-028684    1/1995

* cited by examiner

*Primary Examiner*—Greta L Robinson
*Assistant Examiner*—James J Wilcox
(74) *Attorney, Agent, or Firm*—Fujitsu Patent Center (57) ABSTRACT

A first code-format converting unit extracts data from database management apparatuses that manage databases having same contents, and converts a code format of the extracted data into a common code format. A mismatch-resolving-data generating unit generates mismatch-resolving data for resolving a data mismatch between the database management apparatuses, from the data with the code format converted. A second code-format converting unit converts a code format of the generated mismatch-resolving data into a code format corresponding to the databases. A database updating unit reflects the mismatch-resolving data with the code format converted to the databases.

9 Claims, 10 Drawing Sheets

| | DATABASE A<br>CHARACTER-CODE SET: EBCDIC | | | DATABASE B<br>CHARACTER-CODE SET: SHIFT JIS | | |
|---|---|---|---|---|---|---|
| | P1<br>(CHARACTER) | P2<br>(EXTERNAL DECIMAL NUMBER) | P3<br>(INTERNAL DECIMAL NUMBER) | P1<br>(CHARACTER) | P2<br>(INTEGER) | P3<br>(INTEGER) |
| (1) | 'ABC'<br>(0xC1C2C3) | 123<br>(0xF1F2F3) | 123<br>(0x012F3) | 'ABC'<br>(0x414243) | 123<br>(0x7B) | 123<br>(0x7B) |
| (2) | 'XYZ'<br>(0xE7E8E9) | 111<br>(0xF1F1F1) | 111<br>(0x011F1) | 'abc'<br>(0x616263) | 222<br>(0xDE) | 222<br>(0xDE) |
| (3) | 'XYZ'<br>(0xE7E8E9) | 111<br>(0xF1F1F1) | 111<br>(0x011F1) | 'XYZ'<br>(0x58595A) | 111<br>(0x6F) | 111<br>(0x6F) |

( ): BINARY DATA FOR STORING DATA

FIG.4

| P1 | P2 | P3 |
|---|---|---|
| 'XYZ'<br>(0x58595A) | 111<br>(0x6F) | 111<br>(0x6F) |

| DATA | M1 | M2 | M3 |
|------|----|----|----|
| DATA | R1 | R2 |    |

FIG.8

| | DATABASE A | | | | DATABASE B | | |
|---|---|---|---|---|---|---|---|
| (1) | | M1 | M2 | M3 | | R1 | R2 |
| | A | 100 | 200 | 300 | A | 100 | 200 |
| | B | 110 | 210 | 310 | B | 110 | 210 |
| | C | 120 | 220 | 320 | C | 120 | 220 |
| (2) | | M1 | M2 | M3 | | R1 | R2 |
| | A | 150 | 200 | 300 | A | 100 | 250 |
| | B | 110 | 260 | 310 | B | 160 | 210 |
| | C | 20 | 220 | 320 | C | 100 | 220 |

FIG.9

| | DATABASE A | | | | DATABASE B | | |
|---|---|---|---|---|---|---|---|
| (1) | | M1 | M2 | M3 | | R1 | R2 |
| | A | 150 | 200 | 300 | A | 100 | 250 |
| | B | 110 | 260 | 310 | B | 160 | 210 |
| | C | 20 | 220 | 320 | C | 100 | 220 |
| (2) | | M1 | M2 | M3 | | R1 | R2 |
| | A | 150 | 200 | 300 | A | 150 | 200 |
| | B | 160 | 210 | 310 | B | 160 | 210 |
| | C | 20 | 220 | 320 | C | 20 | 220 |

FIG.10

|   |   | M1/R1 | M2/R2 |
|---|---|---|---|
| A | DATABASE A* | 150 | 200 |
|   | DATABASE B | 100 | 250 |
| B | DATABASE A | 110 | 260 |
|   | DATABASE B* | 160 | 210 |
| C | DATABASE A | 20 | 220 |
|   | DATABASE B | 100 | 220 |

(*: PRIORITY DATA)

|  | MASTER | REPLICA (COPY) |
|---|---|---|
| (1) | <table><tr><td></td><td>R1</td><td>R2</td></tr><tr><td>A</td><td>100</td><td>200</td></tr><tr><td>B</td><td>50</td><td>300</td></tr></table> | <table><tr><td></td><td>R1</td><td>R2</td></tr><tr><td>A</td><td>100</td><td>200</td></tr><tr><td>B</td><td>50</td><td>300</td></tr></table> |
| (2) | <table><tr><td></td><td>R1</td><td>R2</td></tr><tr><td>A</td><td>100</td><td>200</td></tr><tr><td>B</td><td>20</td><td>230</td></tr></table> | <table><tr><td></td><td>R1</td><td>R2</td></tr><tr><td>A</td><td>100</td><td>150</td></tr><tr><td>B</td><td>80</td><td>300</td></tr></table> |
| (3) | <table><tr><td></td><td>R1</td><td>R2</td></tr><tr><td>A</td><td>100</td><td>150</td></tr><tr><td>B</td><td>80</td><td>230</td></tr></table> | <table><tr><td></td><td>R1</td><td>R2</td></tr><tr><td>A</td><td>100</td><td>150</td></tr><tr><td>B</td><td>80</td><td>300</td></tr></table> |
| (4) | <table><tr><td></td><td>R1</td><td>R2</td></tr><tr><td>A</td><td>100</td><td>150</td></tr><tr><td>B</td><td>80</td><td>230</td></tr></table> | <table><tr><td></td><td>R1</td><td>R2</td></tr><tr><td>A</td><td>100</td><td>150</td></tr><tr><td>B</td><td>80</td><td>230</td></tr></table> |

DATA-MISMATCH RESOLVING APPARATUS, DATA-MISMATCH RESOLVING METHOD, AND COMPUTER PRODUCT

BACKGROUND OF THE INVENTION

1. Field of the Invention

The present invention relates to a technology for resolving a data mismatch between plural database management apparatuses that manage databases having the same contents.

2. Description of the Related Art

Recently, with a rapid increase of capacity of a database, a plurality of database management apparatuses has been used for managing same data so as to improve security and reliability of the database. For example, a pair of a master management apparatus and a replica management apparatus is used for managing the same data. In some cases, the master management apparatus and the replica management apparatus employ same code formats, for example, same character codes and/or same matrix. Alternately, when the master management apparatus and the replica management are used in different systems, each code format for each management apparatus can be unique.

Upon managing the same data using different database management apparatuses, each database management apparatus updates the data for each database. Therefore, although the data in each database are the same in the beginning, there occurs data mismatch between the database management apparatuses with time. Thus, technologies for resolving the data mismatch between the different database management apparatuses have been proposed.

For example, Japanese patent Application Laid-Open No. H7-28684 discloses a technology for resolving the data mismatch between the different database management apparatuses by detecting difference between databases managed by the different database management apparatuses and reflecting the difference in updated data of a database into all the database management apparatuses.

Figure 13:
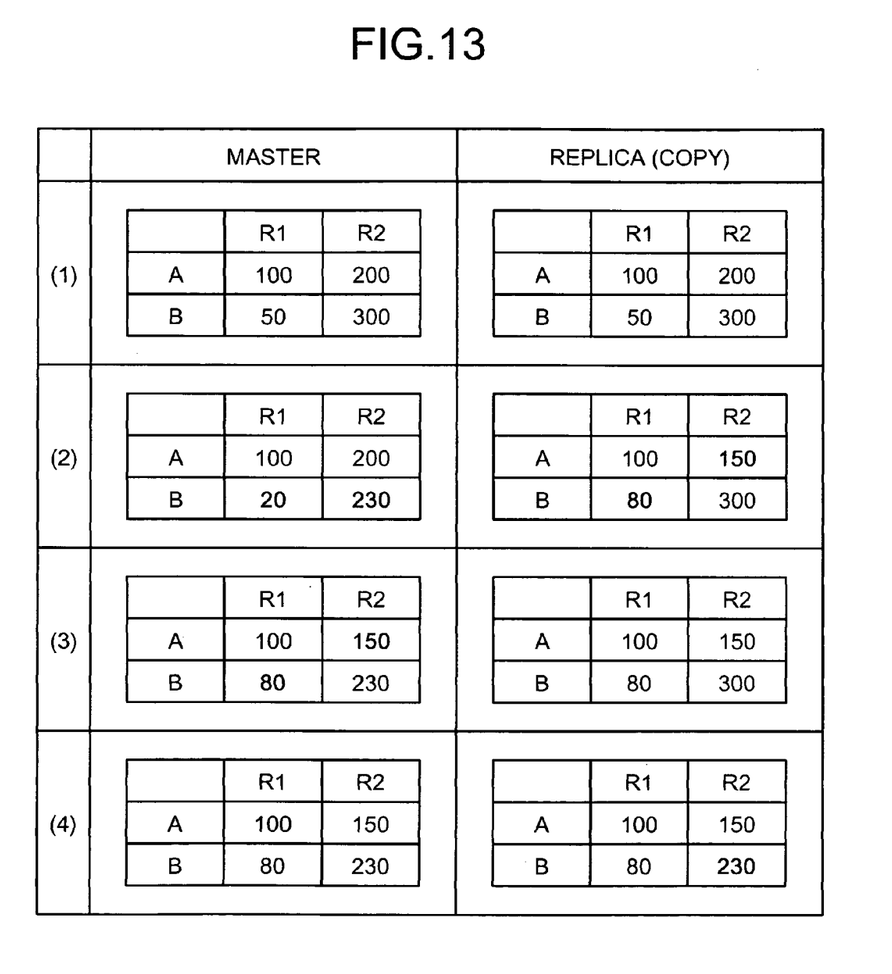
FIG. 13 is a table for explaining a conventional technology.

FIG. 13 is a table for explaining the conventional technology. For example, master data (original data) in a 2×2 matrix are copied in replica data (copied data) (see, FIG. 13(1)) and each data is managed in different database management apparatuses. The master data and the replica data are updated respectively in each database management apparatus, such that the master data represented by (B, R1) is updated from 50 to 20, the master data represented by (B, R2) is updated from 300 to 230, the replica data represented by (A, R2) is updated from 200 to 150, and the replica data represented by (B, R1) is updated from 50 to 80 (see, FIG. 13(2)). As described above, because each database management apparatus updates the data for each database, there occurs the data mismatch among the updated data.

To resolve the data mismatch, the updated data in the replica data are primarily used over the master data so that the updated replica data represented by (A, R2)=150 and (B, R1)=80 are reflected to the master data (see, FIG. 13(3)). Thereafter, the updated data in the master data represented by (B, R2)=230 is reflected to the replica data (see, FIG. 13(4)). The master data represented by (B, R1) has already become the same as the replica data because of the data reflection from the replica data to the master data.

As described above, the difference in the updated data of the replica data is firstly reflected to the master data, and thereafter, the difference in the updated data of the master data is reflected to the replica data, resulting in the data mismatch between the master data (original data) and the replica data (copied data) can be resolved.

However, with the conventional technologies, the data mismatch can be resolved only when the database management apparatuses employ the same code formats. Thus, there still is a problem that the data mismatch cannot be resolved if the code formats among the database management apparatuses are different. For example, when a database A employs an extended binary coded decimal interchange code (EBCDIC) for a character code while a database B employs a Shift-JIS code for a character code, the data mismatch between the database A and the database B cannot be resolved due to an occurrence of a failure caused by the different character codes.

SUMMARY OF THE INVENTION

It is an object of the present invention to at least partially solve the problems in the conventional technology.

A data-mismatch resolving apparatus according to one aspect of the present invention resolves a data mismatch between plural database management apparatuses that manage databases having same contents. The data-mismatch resolving apparatus includes a first code-format converting unit that extracts data from the database management apparatuses, and converts a code format of the extracted data into a predetermined common code format; a mismatch-resolving-data generating unit that generates mismatch-resolving data for resolving the data mismatch, from the data with the code format converted; a second code-format converting unit that converts a code format of the generated mismatch-resolving data into a code format corresponding to each of the databases; and a database updating unit that reflects the mismatch-resolving data with the code format converted to each of the databases.

A data-mismatch resolving method according to another aspect of the present invention is for resolving a data mismatch between plural database management apparatuses that manage databases having same contents. The data-mismatch resolving method includes first code-format converting including extracting data from the database management apparatuses, and converting a code format of the extracted data into a predetermined common code format; generating mismatch-resolving data for resolving the data mismatch, from the data with the code format converted; second code-format converting including converting a code format of the generated mismatch-resolving data into a code format corresponding to each of the databases; and reflecting the mismatch-resolving data with the code format converted to each of the databases.

A computer-readable recording medium according to still another aspect of the present invention stores therein a computer program for resolving a data mismatch between plural database management apparatuses that manage databases having same contents. The computer program causes a computer to execute first code-format converting including extracting data from the database management apparatuses, and converting a code format of the extracted data into a predetermined common code format; generating mismatch-resolving data for resolving the data mismatch, from the data with the code format converted; second code-format converting including converting a code format of the generated mismatch-resolving data into a code format corresponding to each of the databases; and reflecting the mismatch-resolving data with the code format converted to each of the databases.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below.

Figure 1:
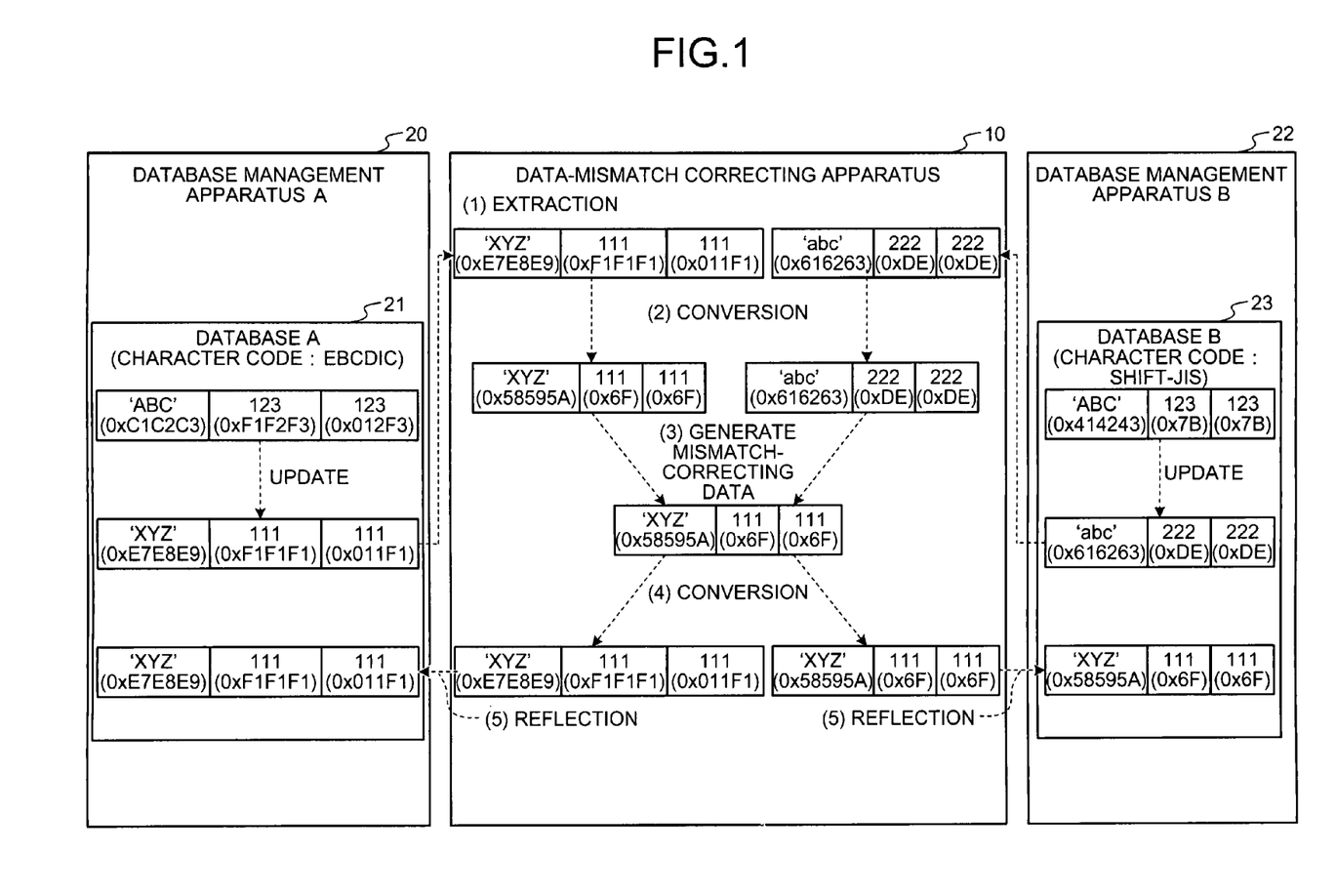
FIG. 1 is a schematic for explaining a structure of a system including a data-mismatch resolving apparatus according to a first embodiment of the present invention.

FIG. 1 is a schematic for explaining a structure of a system including a data-mismatch resolving apparatus 10 according to a first embodiment of the present invention. The data-mismatch resolving apparatus 10 is connected to a database management apparatus A 20 and a database management apparatus B 22, which are configured to manage same data using unique character codes. For example, the database management apparatus A 20 manages a database A 21 using extended binary coded decimal interchange code (EBCDIC) for a character code, while the database management apparatus B 22 manages a database B 23 using Shift-JIS code for a character code. The database management apparatus A 20 and the database management apparatus B 22 store the same data therein. Each database management apparatus manages, for example, data updates.

More specifically, the database A 21 in the database management apparatus A 20 stores data represented as "ABC (0xC1C2C3), 123(0xF1F2F3), 123(0x012F3)" using the EBCDIC character code. On the other hand, the database B 23 in the database management apparatus B 22 stores data represented as "ABC(0x414243), 123(0x7B), 123(0x7B)" using the Shift-JIS character code. The data are updated in each database management apparatus, such that the data in the database A 21 is updated to new data represented as "XYZ (0xE7E8E9), 111(0xF1F1F1), 111(0x011F1), while the data in the database management apparatus B 22 is updated to new data represented as "abc(0x616263), 222(0xDE), 222(0xDE) ". Codes described in round brackets indicate binary data used for storing the data.

With the above configuration, the data-mismatch resolving apparatus 10 resolves data mismatch among a plurality of database management apparatuses that manage the same data in each database. Specifically, the data-mismatch resolving apparatus 10 can resolve the data mismatch between the database management apparatuses that manage the same data using unique code formats for the data.

More particularly, upon receiving an instruction for resolving the data mismatch from a user, the data-mismatch resolving apparatus 10 extracts data from the database management apparatuses and converts the extracted data into a predetermined code format. For example, the data-mismatch resolving apparatus 10 extracts the data represented as "XYZ (0xE7E8E9), 111(0xF1F1F1), 111(0x011F1)" from the database management apparatus A 20 (see, FIG. 1(1)) and converts the extracted data to such data represented as "XYZ (0x58595A), 111(0x6F), 111(0x6F)" using the Shift-JIS character code (see, FIG. 1(2)). Also, the data-mismatch resolving apparatus 10 extracts the data represented as "abc (0x616263), 222(0xDE), 222(0xDE) using the same Shift-JIS character code from the database management apparatus B 22 (see, FIG. 1(1)).

The data-mismatch resolving apparatus 10 generates mismatch-resolving data, for resolving the data mismatch, based on the data extracted from each database in the converted code format. For example, the data-mismatch resolving apparatus 10 compares each data extracted from each database in the converted code format, and if data mismatch is detected, the data-mismatch resolving apparatus 10 generates the mismatch-resolving data represented as "XYZ(0x58595A), 111 (0x6F), 111(0x6F)" (see, FIG. 1(3)) using the data in the database management apparatus A 20 (updated data) and representing in the Shift-JIS character code of the database management apparatus B 22.

Next, the data-mismatch resolving apparatus 10 converts the code format of the generated mismatch-resolving data into a code format corresponding to each database. For example, the data-mismatch resolving apparatus 10 converts the generated mismatch-resolving data represented as "XYZ (0x58595A), 111(0x6F), 111(0x6F)" using the Shift-JIS character code into such data represented as "XYZ (0xE7E8E9), 111(0xF1F1F1), 111(0x011F1)" using the EBCDIC character, which corresponds to the database A 21 (see, FIG. 1(4)). On the other hand, the database B 23 uses the same Shift-JIS character code as that of the mismatch-resolving data. Therefore, the code format is not converted and the mismatch-resolving data represented as "XYZ(0x58595A), 111(0x6F), 111(0x6F)" is used in the database B 23 (see, FIG. 1(4)).

The data-mismatch resolving apparatus 10 reflects the converted mismatch-resolving data to each database in the database management apparatuses. Specifically, the data-mismatch resolving apparatus 10 reflects the converted mismatch-resolving data represented as "XYZ(0xE7E8E9), 111(0xF1F1F1), 111(0x011F1)" to the database A 21 in the database management apparatus A 20 (see, FIG. 1(5)). On the other hand, the data-mismatch resolving apparatus 10 reflects the mismatch-resolving data represented as "XYZ (0x58595A), 111(0x6F), 111(0x6F)" to the database B 23 in the database management apparatus B 22 (see, FIG. 1(5)).

As described above, even when the database A 21 and the database B 23 use different code formats such as the different character codes for managing the same data because of employing unique systems, difference between the databases can be resolved. Thereby, the data mismatch between the database management apparatuses can be resolved regardless of the code formats.

Figure 2:
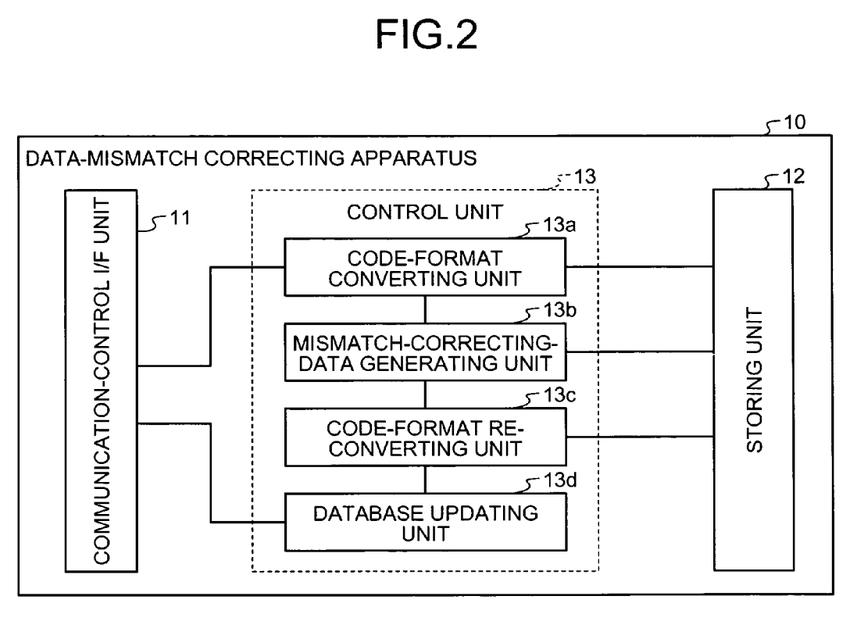
FIG. 2 is a block diagram of the data-mismatch resolving apparatus shown in FIG. 1.
Figure 3:
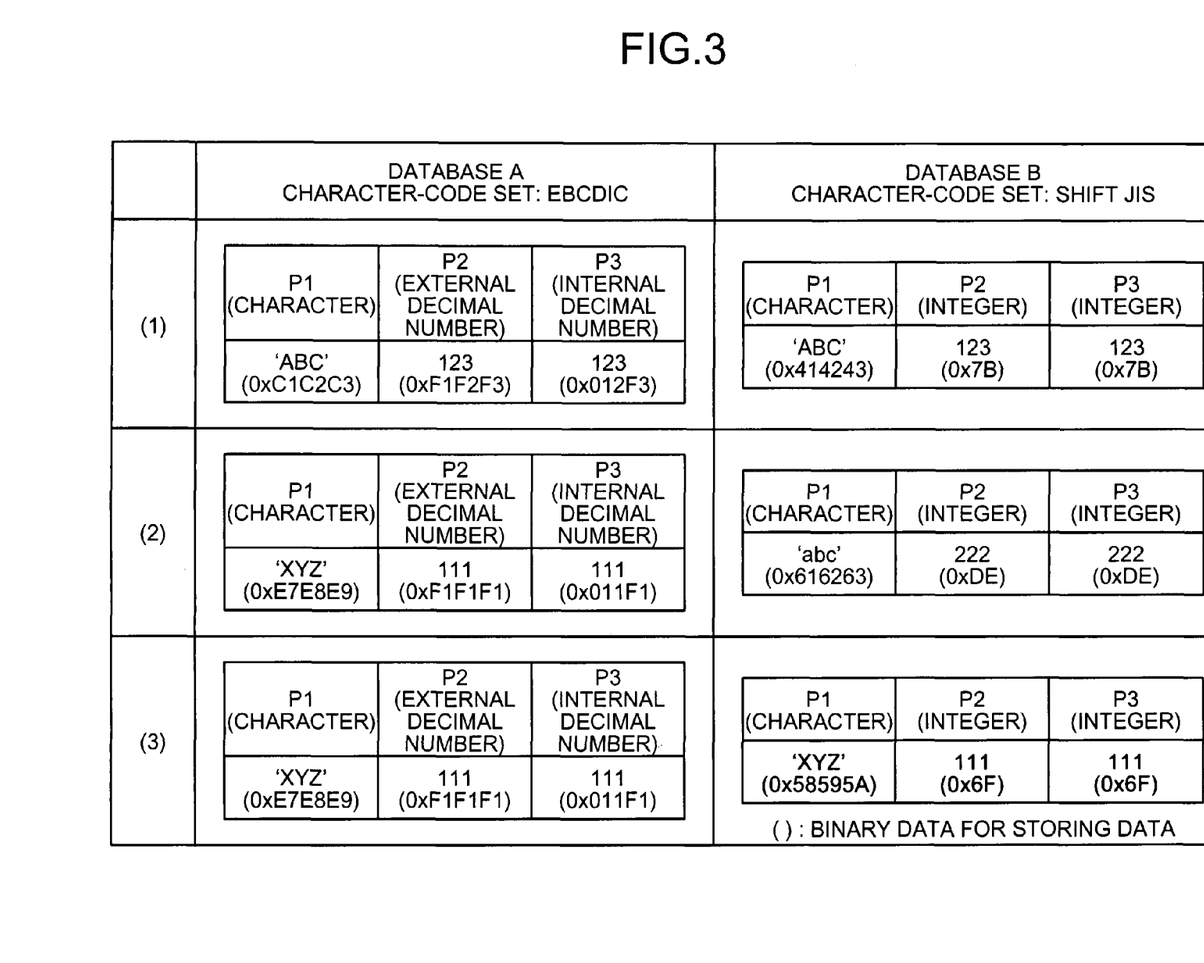
FIG. 3 is an example of the contents of data extracted by the data-mismatch resolving apparatus shown in FIG. 2 for resolving data mismatch between databases.
Figure 4:
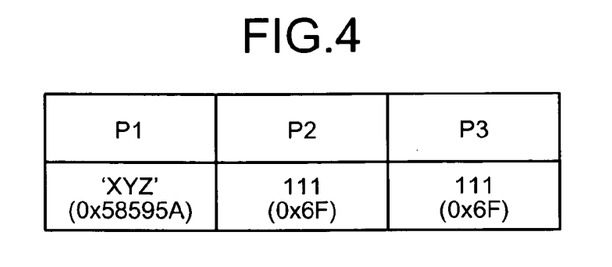
FIG. 4 is an example of the contents of mismatch-resolving data generated by the data-mismatch resolving apparatus shown in FIG. 2.

FIG. 2 is a block diagram of the data-mismatch resolving apparatus 10. FIG. 3 is an example of the contents of data extracted by the data-mismatch resolving apparatus 10 for resolving the data mismatch between the databases. FIG. 4 is an example of the contents of the mismatch-resolving data generated by the data-mismatch resolving apparatus 10. The data-mismatch resolving apparatus 10 includes a communication-control I/F unit 11, a storing unit 12, and a control unit 13.

The communication-control I/F unit 11 controls communications related to various pieces of information transmitted between the database management apparatuses connected to the data-mismatch resolving apparatus 10. The communication-control I/F unit 11 receives data from the database A 21 and the database B 23 respectively stored in the database management apparatus A 20 and the database management apparatus B 22. Further, the communication-control I/F unit 11 transmits the mismatch-resolving data used for resolving the data mismatch to the database management apparatus A 20 and the database management apparatus B 22.

The storing unit 12 stores data and programs necessary for various processing performed by the control unit 13. For example, the storing unit 12 stores data extracted and converted by a code-format converting unit 13*a* and the mismatch-resolving data generated by a mismatch-resolving-data generating unit 13*b*. Also, the storing unit 12 stores character codes used by the code-format converting unit 13*a* for converting data. Further, the storing unit 12 stores a priority policy determining priority data that is primarily used for resolving the data mismatch among the database management apparatuses. For example, it is determined for the database management apparatus A 20 and the database management apparatus B 22 that the data in the database management apparatus A 20 is primarily used for the data, while the character code of the database management apparatus B 22 is primarily used for the character code for resolving the data mismatch.

The control unit 13 includes an internal memory for storing a control program such as an operating system (OS), other programs determining various processing procedure, and necessary data and executes various processing therewith. In relation to the present invention, the control unit 13 includes the code-format converting unit 13*a*, the mismatch-resolving-data generating unit 13*b*, a code-format re-converting unit 13*c*, and a database updating unit 13*d*. The code-format converting unit 13*a* corresponds to a first code-format converting unit in claims. Similarly, the mismatch-resolving-data generating unit 13*b* corresponds to a mismatch-resolving-data generating unit the code-format re-converting unit 13*c* corresponds to a second code-format converting unit, and the database updating unit 13*d* corresponds to a database updating unit in claims.

The code-format converting unit 13*a* extracts data from the database management apparatuses and converts the extracted data into a predetermined common code format. For example, the code-format converting unit 13*a* extracts data from the database A 21 and the database B 23 respectively stored in the database management apparatus A 20 and the database management apparatus B 22, converts each extracted data, and stores the converted data in the storing unit 12.

As shown in FIG. 3(1), the database A 21 in the database management apparatus A 20 stores data in a matrix using the EBCDIC character code, in which P1 indicates a character, P2 indicates an external decimal number, and P3 indicates an internal decimal number, resulting in representing the data as "ABC(0xC1C2C3), 122(0xF1F2F3), 123(0x012F3)". On the other hand, the database B 23 in the database management apparatus B 22 stores data in a matrix using the Shift-JIS character code, in which P1 indicates a character, P2 indicates an integer, and P3 indicates an integer, resulting in representing the data as "ABC(0x414243), 123(0x7B), 123(0x7B). Each data is updated in each database of each database management apparatus. For example, as shown in FIG. 3(2), the data in the database A 21 is updated to new data represented as "XYZ(0xE7E8E9), 111(0xF1F1F1), 111(0x011F1)", while the data in the database B 23 is updated to new data represented as "abc(0x616263), 222(0xDE), 222(0xDE)".

With the above condition, upon receiving an instruction for resolving data mismatch from a user, the data-mismatch resolving apparatus 10 extracts the data represented as "XYZ (0xE7E8E9), 111(0xF1F1F1), 111(0x01F1)" from the database A 21 in the database management apparatus A 20, and extracts the data represented as "abc(0x616263), 222(0xDE), 222(0xDE)" from the database B 23 in the database management apparatus B 22. Thereafter, the data-mismatch resolving apparatus 10 converts each extracted data into the predetermined Shift-JIS character code.

Namely, the data represented as "XYZ(0xE7E8E9), 111 (0xF1F1F1), 111(0x011F1)" using the EBCDIC character code in the database A 21 is converted into such data represented as "XYZ(0x58595A), 111(0x6F), 111(0x6F)" and to be stored in the storing unit 12. On the contrary, because the data in the database B 23 in the database management apparatus B 22 uses the same Shift-JIS character code as that of the predetermined code format, the data from the database B 23 is to be stored in the storing unit 12 without converting the code format.

The mismatch-resolving-data generating unit 13*b* generates the mismatch-resolving data, for resolving data mismatch between the databases, based on the data in each database, represented with the code formats converted by the code-format converting unit 13*a*. For example, the mismatch-resolving-data generating unit 13*b* compares the data represented as "XYZ(0x58595A), 111(0x6F), 111(0x6F)" using the converted code formats in the storing unit 12 with the data represented as "abc(0x616263), 222(0xDE), 222(0xDE)" in the storing unit 12. When detecting the data mismatch, the mismatch-resolving-data generating unit 13*b* generates the mismatch-resolving data represented as "XYZ(0x58595A), 111(0x6F), 111(0x6F)" and stores the mismatch-resolving data in the storing unit 12 as shown in FIG. 4. Upon generating the mismatch-resolving data, the mismatch-resolving-data generating unit 13*b* generates the mismatch-resolving data represented as "XYZ(0x58595A), 111(0x6F), 111 (0x6F)" based on the priority policy stored in the storing unit 12, which determines that the data in the database A 21 ("XYZ(0x58595A), 111(0x6F), 111(0x6F)") is primarily used for the data, while the Shift-JIS character code in the database B 23 is primarily used for the character code. The priority data and the priority character code can be arbitrarily changed.

The code-format re-converting unit 13*c* re-converts the code format of the mismatch-resolving data generated by the mismatch-resolving-data generating unit 13*b* into the code format corresponding to each database. For example, as shown in FIG. 3(3), the code-format re-converting unit 13c converts the mismatch-resolving data represented as "XYZ (0x58595A), 111(0x6F), 111(0x6F)" into data represented as "XYZ(0xE7E8E9), 111(0xF1F1F1), 111(0x011F1)" using the EBCDIC character code for the database A 21 in the database management apparatus A 20. On the other hand, the code-format re-converting unit 13c converts the mismatch-resolving data represented as "XYZ(0x58595A), 111(0x6F), 111(0x6F)" into data represented as "XYZ(0x58595A), 111 (0x6F), 111(0x6F)" using the Shift-JIS character code. In this case, because the Shift-JIS character code used in the database B 23 in the database management apparatus B 22 is the same as the Shift-JIS character code used for the generated mismatch-resolving data, conversion of the code format is not necessarily needed.

The database updating unit 13d reflects the mismatch-resolving data converted by the code-format re-converting unit 13c to each database in the database management apparatuses. For example, the database updating unit 13d stores the data represented as "XYZ(0xE7E8E9), 111(0xF1F1F1), 111(0x011F1)", which code format is re-converted by the code-format re-converting unit 13c, in the database A 21. On the other hand, the database updating unit 13d stores the data represented as "XYZ(0x58595A), 111(0x6F), 111(0x6F)" in the database B 23.

Figure 5:
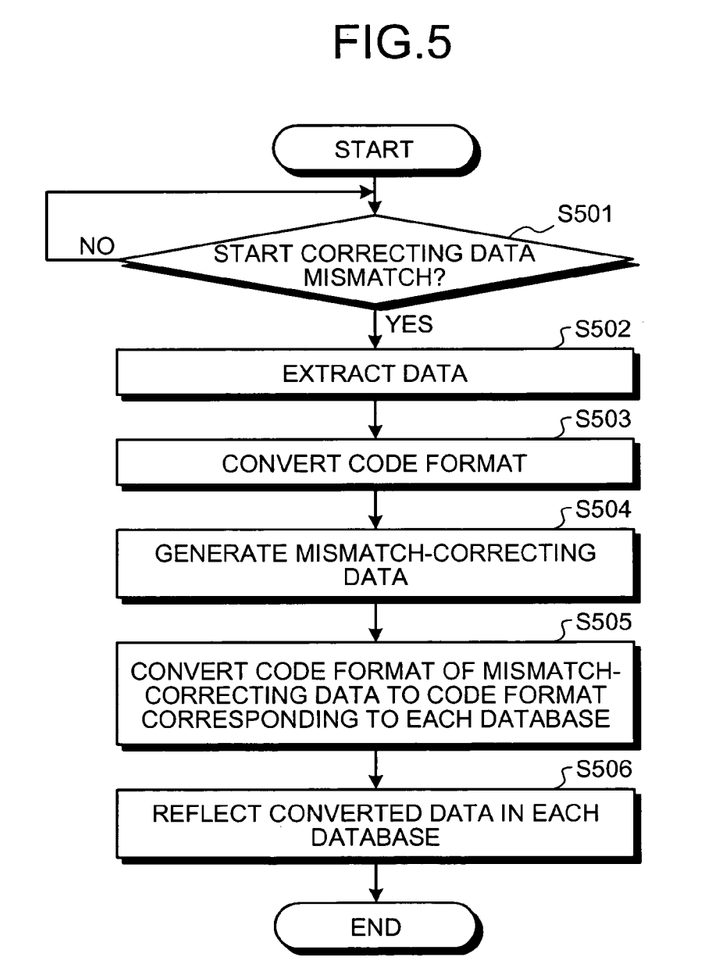
FIG. 5 is a flowchart of a processing procedure for an operation of resolving the data mismatch by the data-mismatch resolving apparatus shown in FIG. 2.

FIG. 5 is a flowchart of a processing procedure for an operation of resolving the data mismatch by the data-mismatch resolving apparatus 10. When a user starts instructing an operation for resolving the data mismatch or an automatic instruction for resolving the data mismatch is started at regular time interval (YES at step S501), the code-format converting unit 13a in the data-mismatch resolving apparatus 10 extracts data from database management apparatuses (step S502), and converts a code format of the extracted data into a predetermined code format (step S503).

The mismatch-resolving-data generating unit 13b compares each data, with the code format converted by the code-format converting unit 13a, in each database. Thereafter, upon detecting the data mismatch, the mismatch-resolving-data generating unit 13b generates the mismatch-resolving data used for resolving the data mismatch between the databases (step S504). If the data mismatch is not detected after comparing each data represented in the converted code format in each database, the mismatch-resolving-data generating unit 13b terminates processing procedure for resolving the data mismatch.

The database updating unit 13d reflects the mismatch-resolving data, which code format is converted by the code-format re-converting unit 13c, to each database in the database management apparatuses (step S506).

According to the firs embodiment, the data-mismatch resolving apparatus extracts data from the database management apparatuses, converts the code format of the extracted data into the predetermined code format, generates the mismatch-resolving data for resolving the data mismatch between the databases based on the data represented with the converted code format in each database, re-converts the code format of the mismatch-resolving data into the code format corresponding to each database, and reflects the re-converted mismatch-resolving data to each database in the database management apparatuses. Therefore, even when the database A 21 and the database B 23 employ different code formats such as the unique character code for employing the unique system, because the data mismatch between the databases are resolved, the data mismatch between the database management apparatus A 20 and the database management apparatus B 22, which manage the same data, can be resolved regardless of the code formats. Further, because the data mismatch between the databases can be resolved using the data-mismatch resolving apparatus other than the database management apparatuses, operation load on the database management apparatus can be reduced compared with using the database management apparatuses for resolving the data mismatch. Moreover, even when the database management apparatus A 20 and the database management apparatus B 22 do not include functions for detecting difference between each data, the data mismatch between the database management apparatus A 20 and the database management apparatus B 22, which manage the same data, can be resolved.

According to the first embodiment, when the character codes and/or number of rows and columns in a matrix for storing the data are different between the database management apparatuses, the extracted data is converted into a predetermined code format using common character code and common table. Therefore, even when the character codes and the matrixes for managing the database are different among the database management apparatuses, because the data is converted into the predetermined code format, the data mismatch between the database management apparatus A 20 and the database management apparatus B 22, which manage the same data, can be resolved regardless of the code formats.

The processing procedure for the operation of resolving the data mismatch between the database management apparatuses using unique character codes for managing data is explained in the first embodiment. However, the present invention is not limited to the above embodiment and can be applied to other database management apparatus that manages data using unique matrixes with unique number of rows and columns.

A processing procedure for the operation of resolving the data mismatch between the database management apparatuses that manage data using unique matrixes with unique number of rows and columns is explained below.

Figure 6:
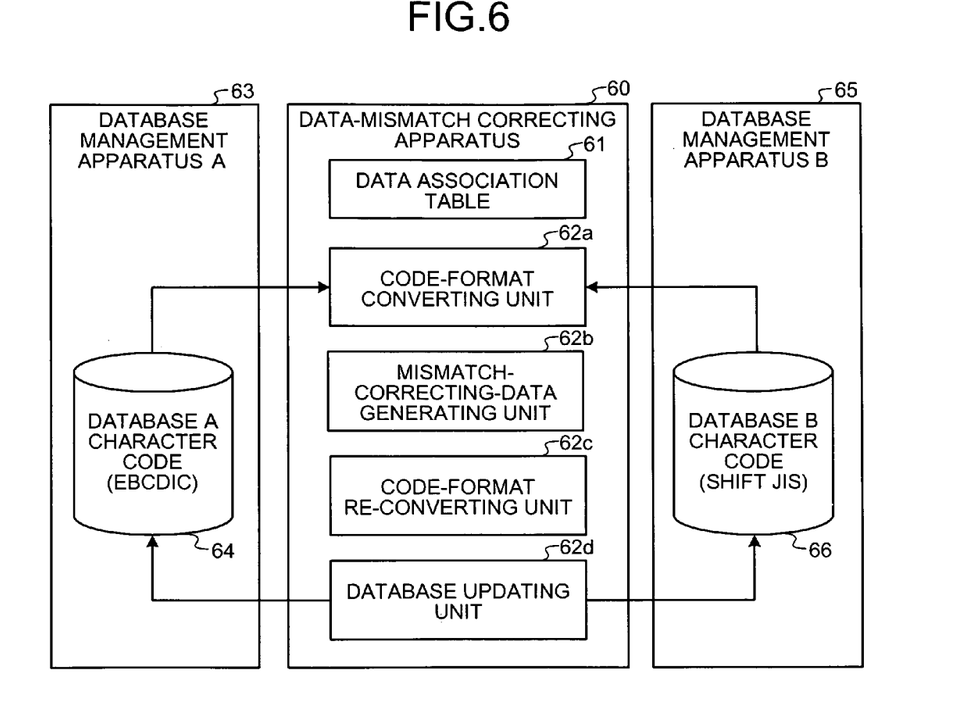
FIG. 6 is a schematic for explaining a structure of a system including a data-mismatch resolving apparatus according to a second embodiment of the present invention.
Figure 7:
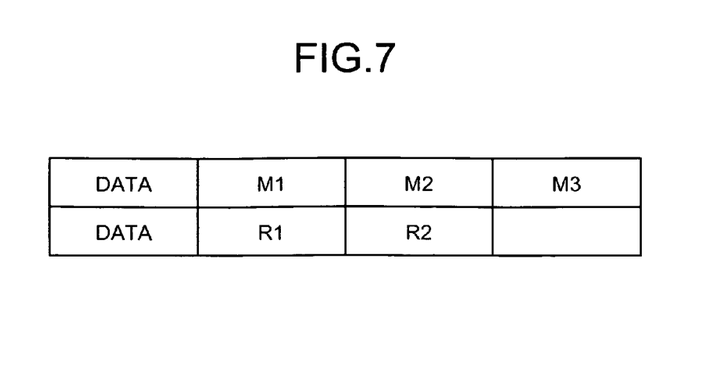
FIG. 7 is an example of the contents of a data association table according to the second embodiment.
Figure 8:
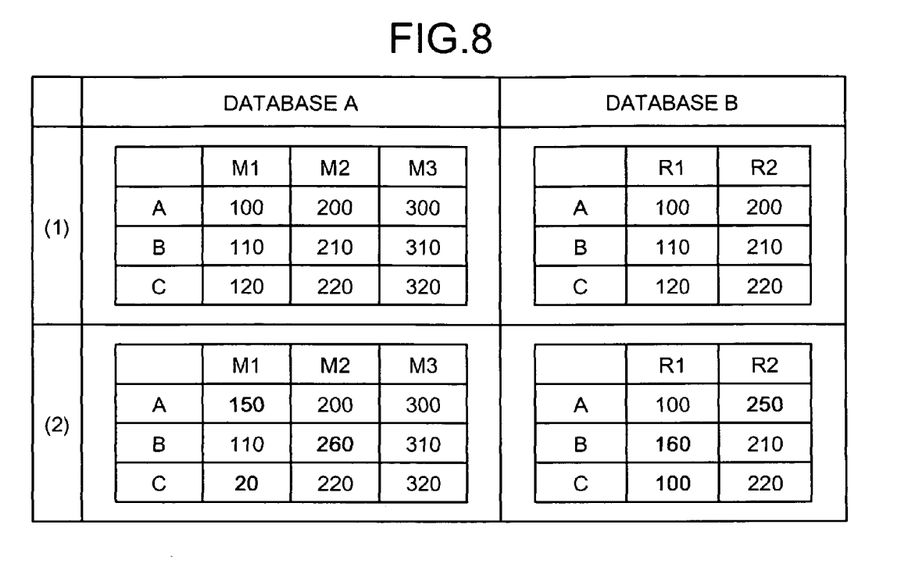
FIG. 8 is an example of the contents of data extracted by the data-mismatch resolving apparatus shown in FIG. 6.
Figure 9:
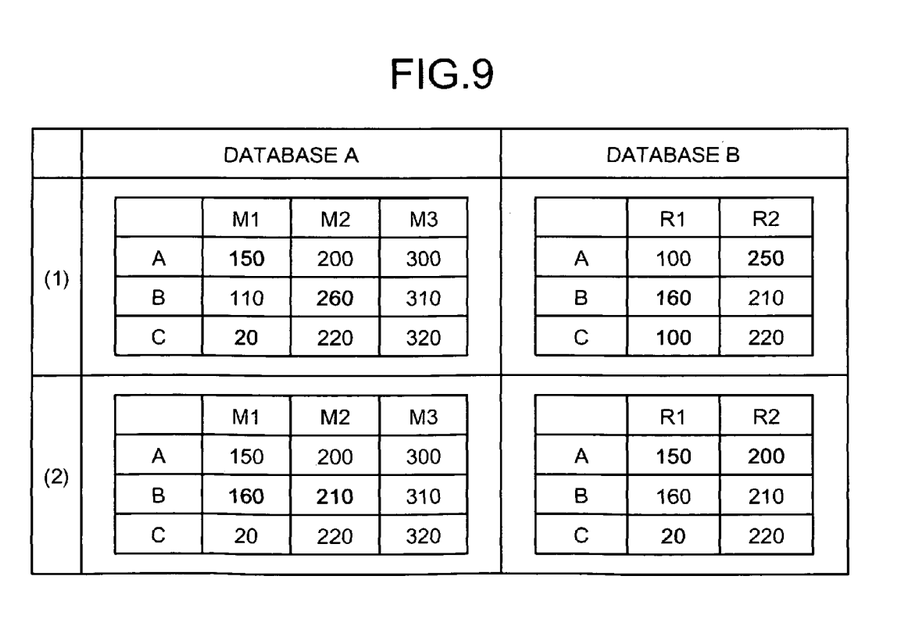
FIG. 9 is an example of the contents of data, which mismatch is to be resolved by the data-mismatch resolving apparatus shown in FIG. 6.
Figure 10:
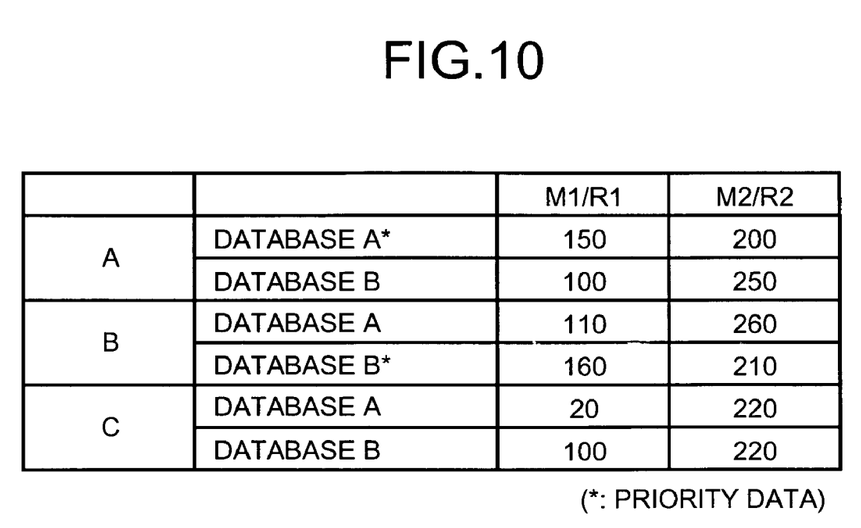
FIG. 10 is a result obtained by comparing data extracted from databases by the data-mismatch resolving apparatus shown in FIG. 6.

FIG. 6 is a schematic for explaining a structure of a system including a data-mismatch resolving apparatus 60 according to a second embodiment of the present invention. FIG. 7 is an example of the contents of a data association table according to the second embodiment. FIG. 8 is an example of the contents of data extracted by the data-mismatch resolving apparatus 60. FIG. 9 is an example of the contents of data mismatch to be resolved by the data-mismatch resolving apparatus 60. FIG. 10 is a result obtained by comparing data extracted from databases by the data-mismatch resolving apparatus 60.

The data-mismatch resolving apparatus 60 is connected to a database management apparatus A 63 and a database management apparatus B 65, which manage data using a matrix with unique number of rows and columns and using unique character codes. The database management apparatus A 63 manages a database A 64 using a 3×3 matrix, while the database management apparatus B 65 manages a database B 66 using a 3×2 matrix. The data-mismatch resolving apparatus 60 stores a data association table that determines data association between the database management apparatuses. Each database management apparatus manages, for example, data updates.

As shown in FIG. 8(1), the database A 64 in the database management apparatus A 63 stores nine pieces of data represented as, for example, (A, M1)=100, (B, M2)=210, (C, M3)=320, using the 3×3 matrix. Similarly, the database B 66 in the database management apparatus B 65 stores six pieces of data represented as, for example, (A, R1)=100, (B, R2)=210, using the 3×2 matrix. The data represented by (A, M1), (A, M2), (B, M1), (B, M2), (C, M1), and (C, M2) in the database A 64 is the same as the data represented by (A, R1), (A, R2), (B, R1), (B, R2), (C, R1), and (C, R2).

The data-mismatch resolving apparatus 60 stores a table that associates columns in the database A 64 with columns in the database B 66 as described in the data association table in FIG. 7. Namely, a column represented by M1 in the database A 64 is associated with a column represented by R1 in the database B 66, while a column represented by M2 in the database A 64 is associated with a column represented by R2 in the database B 66.

With the above configuration, as shown in FIG. 8(2), data represented by (A, M1) is updated from 100 to 150, data represented by (B, M2) is updated from 210 to 260, and data represented by (C, M1) is updated from 120 to 20 in the database A 64. Further, data represented by (A, R2) is updated from 200 to 250, data represented by (B, R1) is updated from 110 to 160, and data represented by (C, R1) is updated from 120 to 100 in the database B 66.

Upon receiving an instruction for resolving data mismatch from a user, the data-mismatch resolving apparatus 60 extracts data from the database management apparatuses. For example, as shown in FIG. 9(1), the data-mismatch resolving apparatus 60 extracts the nine pieces of data represented as, for example, (A, M1)=100, (B, M2)=210, and (C, M3)=320, using the 3×3 matrix in the database A 64 of the database management apparatus A 63. Similarly, the data-mismatch resolving apparatus 60 extracts the six pieces of data represented as, for example, (A, R1)=100, (B, R2)=210, using the 3×2 matrix in the database B 66 of the database management apparatus B 65.

Next, the data-mismatch resolving apparatus 60 generates mismatch-resolving data for resolving the data mismatch between the extracted data, based on the data association table that includes a priority policy determining a priority data and the data association between the database management apparatuses. Specifically, the data-mismatch resolving apparatus 60 generates the mismatch-resolving data for resolving the data mismatch between the extracted data, based on the data association table that determines the data association between the database A 64 and the database B 66. In the embodiment, because only the data association is determined in the data association table, the data-mismatch resolving apparatus 60 accepts an instruction for the priority policy determining a priority data from a user.

Namely, as shown in FIG. 10, the data-mismatch resolving apparatus 60 displays a result obtained by comparing the database A 64 with the database B 66 based on the data association table and assists the user to determine the priority data. In FIG. 10, data with asterisk (*) is determined as the priority data by the user. For example, it is determined that the data in the database A 64 is primarily used for row A, while the data in the database B 66 is primarily used for row B. In case that the priority data is not determined by the user as shown with row C, the data in the database A 64 is primarily used.

The data-mismatch resolving apparatus 60 converts the code format of the generated mismatch-resolving data into the code format corresponding to each database. For example, as shown in FIG. 9(2), the data-mismatch resolving apparatus 60 converts data in row A into "150, 200, 300", converts data in row B into "160, 210, 310", and converts data in row C into "20, 220, 320" in the database A 64 based on the data association table and the user settings. Similarly, the data-mismatch resolving apparatus 60 converts data in row A into "100, 250", converts data in row B into "160, 210", and converts data in row C into "20, 220" in the database B 66.

The data-mismatch resolving apparatus 60 reflects the converted mismatch-resolving data into each database in the database management apparatuses. For example, the data-mismatch resolving apparatus 60 reflects the data of "150, 200, 300" in row A, "160, 210, 310" in row B, and "20, 220, 320" in row C into the database A 64. Similarly, the data-mismatch resolving apparatus 60 reflects the data of "100, 250" in row A, "160, 210" in row B, and "20, 220" in row C into the database B 66.

As described above, when the data mismatch between the database A 64 and the database B 66 is resolved, the priority data can be determined among the database management apparatuses such that the data in the database A 64 is primarily used for the data in the first row, and the data in the database B 66 is primarily used for the data in the second row, resulting in determining the priority data more precisely compared with giving the priority to one database.

Further, upon generating the mismatch-resolving data for resolving the data mismatch, the user can determine the priority data. Therefore, the priority data can be easily changed according to a need.

Figure 11:
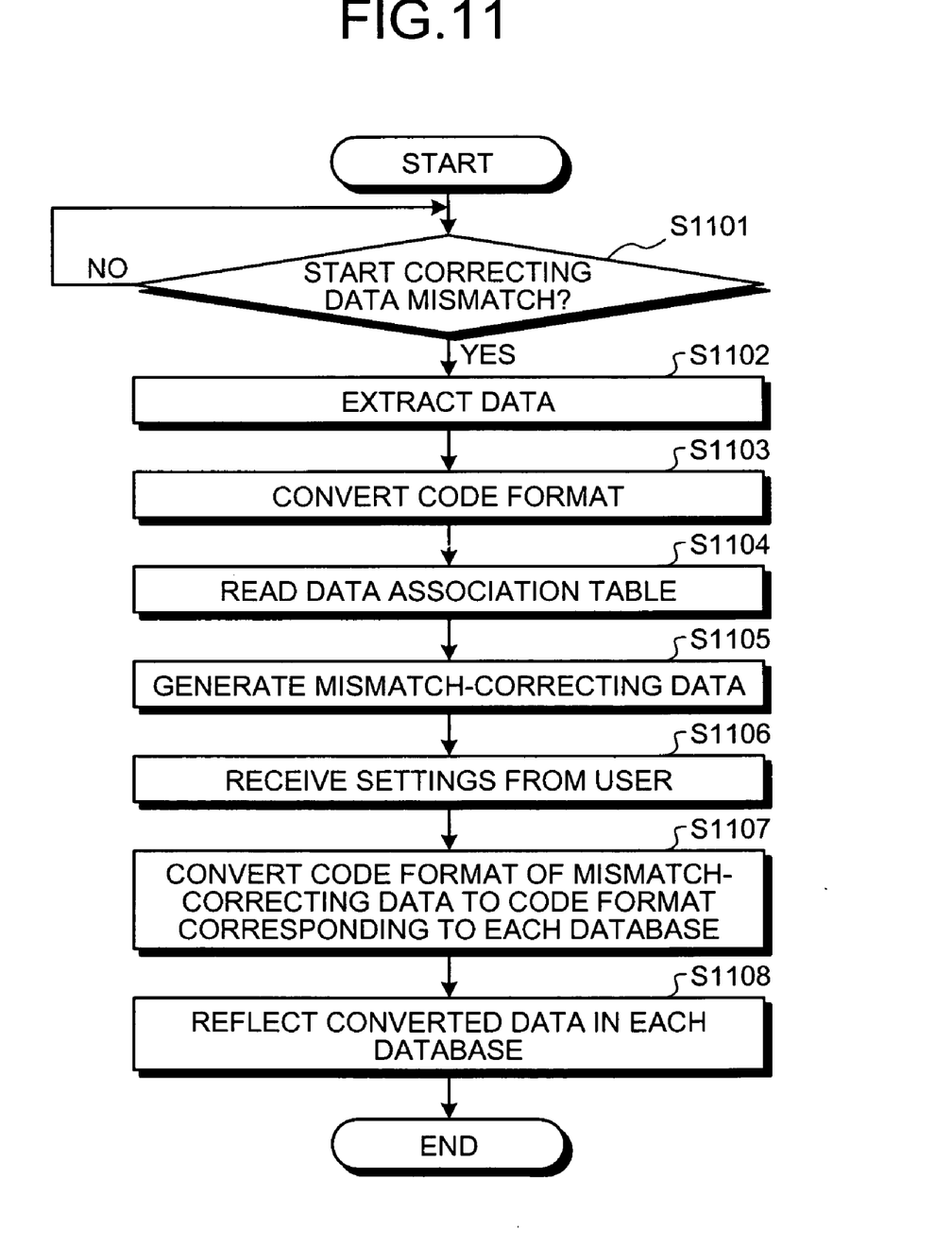
FIG. 11 is a flowchart of a processing procedure for an operation of resolving data mismatch by the data-mismatch resolving apparatus shown in FIG. 6.

FIG. 11 is a flowchart of a processing procedure for an operation of resolving the data mismatch by the data-mismatch resolving apparatus 60. When a user starts instructing an operation for resolving the data mismatch or an automatic instruction for resolving the data mismatch is started at regular time interval (YES at step S1101), the data-mismatch resolving apparatus 60 extracts data from the database management apparatus A 63 and the database management apparatus B 65 (step S1102). Thereafter, the data-mismatch resolving apparatus 60 converts the code formats of the extracted data to a predetermined code format (step S1103).

Next, the data-mismatch resolving apparatus 60 reads the data association table (step S1104). Thereafter, the data-mismatch resolving apparatus 60 generates the mismatch-resolving data for resolving the difference between the extracted data, based on the priority policy determining the priority data and the data association table that determines the data association between the database management apparatus A 63 and the database management apparatus B 65 (step S1105).

Next, the data-mismatch resolving apparatus 60 displays a result obtained by comparing the database A 64 and the database B 66 based on the data association table and assists the user to determine the priority data (step S1106).

The data-mismatch resolving apparatus 60 converts the code format of the generated mismatch-resolving data into the code format corresponding to each database (step S1107), and reflects the converted mismatch-resolving data to each database in the database A 64 and the database B 66 (step S1108).

According to the second embodiment, the data-mismatch resolving apparatus 60 generates the mismatch-resolving data for resolving the data mismatch between the extracted data, based on the priority policy determining the priority data and the data association table that determines the data association between the database management apparatus A 63 and the database management apparatus B 65. Therefore, when the data mismatch between the database A 64 and the database B 66 is resolved, the priority data can be determined among the database management apparatuses such that the database A 64 is primarily used for the first row, and the database B 66 is primarily used for the second row, resulting in determining the priority data more precisely compared with giving the priority to one database.

According to the second embodiment, the data-mismatch resolving apparatus 60 accepts a setting for the data association table from a user and generates the mismatch-resolving data for resolving the difference between the extracted data based on the priority policy received from the user and the data association table. Therefore, when the mismatch-resolving data for resolving the data mismatch is generated, the priority data can be determined by the user, resulting in the priority data can be easily changed according to a need.

The present invention is not limited to the above embodiments and can be applied to other various embodiments.

According to the first and the second embodiments, the two database management apparatuses are used. However, the number of the database management apparatuses is not limited two. It is possible to extract data from, for example, three, five, or more database management apparatuses.

According to the first embodiment, the case using the unique character codes is explained. On the other hand, the case using the unique matrix with unique number of rows and columns is explained in the second embodiment. However, the present invention is not limited to the above cases and can be applied to other code formats using both unique character codes and the unique matrix therein.

According to the first and the second embodiments, it is explained that the data-mismatch resolving apparatuses are configured as being separated from the database management apparatus and being dedicated for resolving the data mismatch. However, the present invention is not limited to the above configuration. The data-mismatch resolving apparatus needs not be separated from the database management apparatus, and the database management, apparatus can include functions corresponding to the data-mismatch resolving apparatus.

The operation processing, the control procedure, the detailed descriptions, various data, and information including parameters, which are explained with the examples of the structures for each database shown in FIGS. 3, 4, 8, and 9, the example of the data association table shown in FIG. 7, and the result obtained by comparing data shown in FIG. 10 can be arbitrarily changed, unless otherwise noted.

The constituent elements of the data-mismatch resolving apparatus shown in the drawings are based on functional concepts. The constituent elements do not necessarily have to be physically arranged in the way shown in the drawings. In other words, the specific mode in which the apparatuses are distributed and integrated is not limited to the ones shown in the drawings. A part or all of the apparatuses may be distributed or integrated functionally or physically in any arbitrary units, according to various loads and the status of use. A part or all of the processing functions offered by the apparatuses may be realized by a central processing unit (CPU) and a program analyzed and executed by the CPU, or may be realized as hardware with wired logic.

The processing procedures explained in the present embodiments can be realized executing predetermined programs using a computer system such as a personal computer or a workstation. The computer system that executes programs including the same functions of the above embodiments is explained below.

Figure 12:
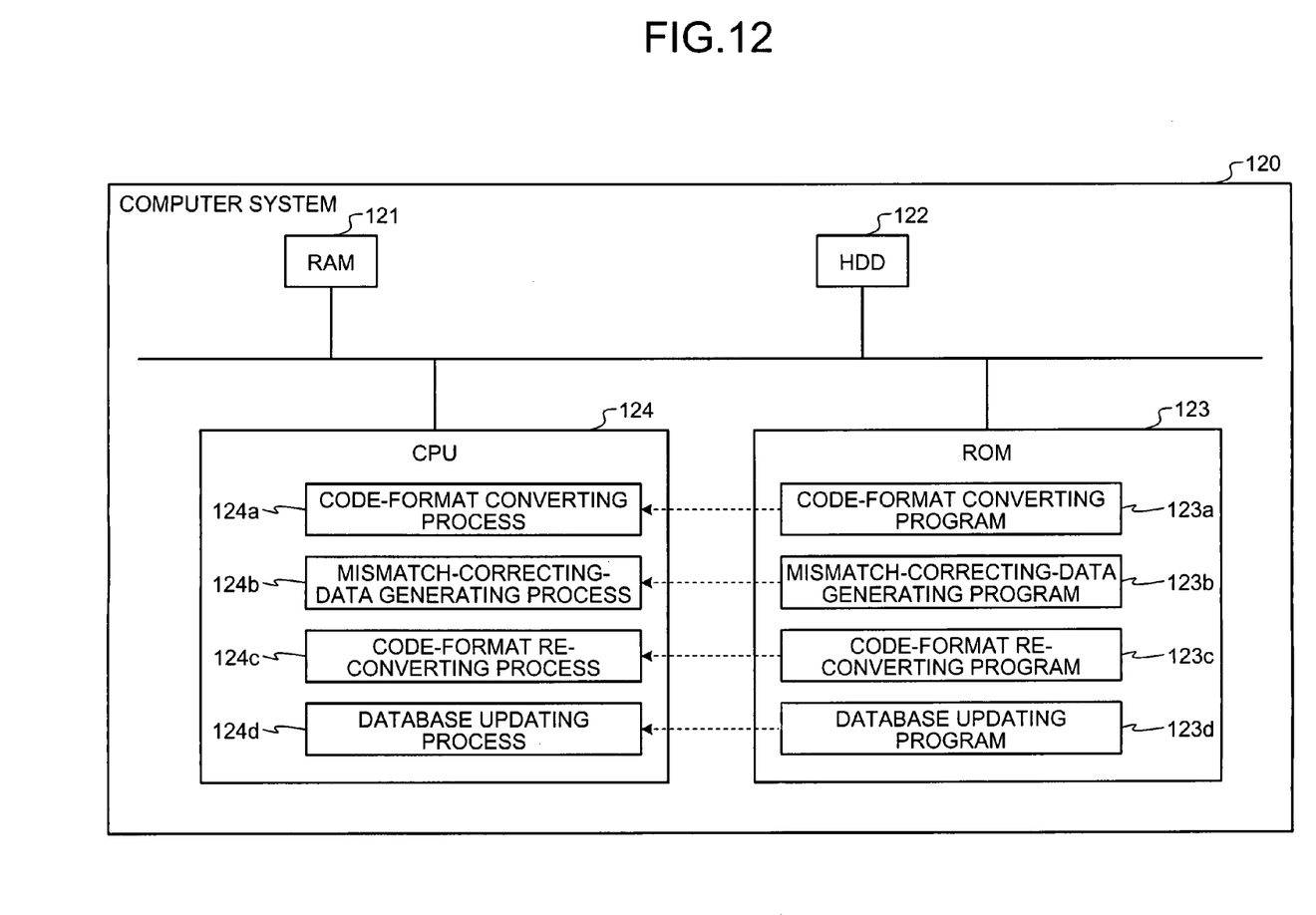
FIG. 12 is a block diagram of a computer system that executes a data-mismatch resolving program according to the present invention.

FIG. 12 is a block diagram of a computer system 120 that executes a data-mismatch resolving program according to the present invention. The computer system 120 includes a random access memory (RAM) 121, a hard disk drive (HDD) 122, a read only memory (ROM) 123, and a CPU 124. The ROM 123 stores therein programs that realize the same functions as explained in the above embodiments. Namely, as shown in FIG. 12, the ROM 123 stores a code-format converting program 123a, a mismatch-resolving-data generating program 123b, a code-format re-converting program 123c, and a database updating program 123d.

The CPU 124 reads out and executes the programs 123a to 123d, which are respectively used as a code-format converting process 124a, a mismatch-resolving-data generating process 124b, a code-format re-converting process 124c, and a database updating process 124d as shown in FIG. 12. Referring back to FIG. 2, the code-format converting process 124a corresponds to the code-format converting unit 13a, the mismatch-resolving-data generating process 124b corresponds to the mismatch-resolving-data generating unit 13b, the code-format re-converting process 124c corresponds to the code-format re-converting unit 13c, and the database updating process 124d corresponds to the database updating unit 13d.

The HDD 122 stores data extracted and converted by the code-format converting process 124a and mismatch-resolving data generated by the mismatch-resolving-data generating process 124b. Also, the HDD 122 stores character codes for converting data by the code-format converting process 124a.

The programs 123a to 123d need not be stored in the ROM 123. The programs 123a to 123d can be stored in a movable physical medium such as a flexible disk (FD), a compact disk-read only memory (CD-ROM), a magneto optical (MO) disk, a digital versatile disk (DVD), or an integrated-circuit (IC) card. Alternately, the programs 123a to 123d can be stored in a fixed physical medium such as an internal HDD equipped in the computer system 120 or an external HDD attached to the computer system 120. Further, the programs 123a to 123d can be stored in other computer system connected to the computer system 120 via a public line, the Internet, a local area network (LAN), or a wide area network (WAN) so that the computer system 120 can reads out the programs therefrom for the execution.

In other words, the programs according to the embodiment is recorded in a computer-readable recording medium such as a movable physical medium, a fixed physical medium, or a communication medium. The computer system 120 reads out the programs from the above media and executes the programs to realize the same functions as those explained with the present embodiments. The program according to the embodiment is not limited to such that executed by the computer system 120. The present invention can be applied to other computer system and a server that execute the programs respectively or execute the programs cooperatively.

According to an embodiment of the present invention, even when the same data is stored using different code formats such as different character codes due to an employment of different systems between a master database and a replica database, because the difference between the databases are resolved converting the unique code formats into a common code format, the data mismatch between the database management apparatuses that manage the same data can be resolved. Further, the data mismatch can be resolved using the data-mismatch resolving apparatus other than using the data management apparatus. Therefore, operation load on the data management apparatus can be reduced compared with using the database management apparatus for resolving the data mismatch. Further, when the database management apparatus does not include functions for detecting the data mismatch, the data-mismatch resolving apparatus can resolve the data mismatch between the database management apparatuses that manage the same data.

Furthermore, according to an embodiment of the present invention, even when there are unique character codes and unique matrixes with the unique number of rows and columns among the database management apparatuses, the character codes and the matrixes can be converted into the common character codes and the matrixes for resolving the data mismatch. Therefore, the data mismatch can be resolved among the database management apparatuses that manage the same data regardless of the different code formats for the data.

Moreover, according to an embodiment of the present invention, when resolving the data mismatch between the database A and the database B, the priority data can be determined such that the database A is primarily used for the first row, while the database B is primarily used for the second row. Therefore, the priority data can be more precisely determined compared with giving the priority to one database.

Furthermore, according to an embodiment of the present invention, when generating the mismatch-resolving data for resolving the data mismatch, the priority data can be determined by the user. As a result, the priority data can be easily changed according to a need.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data-mismatch resolving apparatus that resolves a data mismatch between a first database managed by a first management apparatus and a second database managed by a second management apparatus, the first database corresponding to the second database, the data-mismatch resolving apparatus comprising:
    a processor; and
    a memory storing computer-readable instructions, execution of the instructions by the processor configuring the data-mismatch resolving apparatus to include
    a first code-format converting unit that extracts first and second data from the first and second databases respectively, the first data being in a first code format and the second data being in a second code format, and converts the first and second code formats of the extracted first and second data into a common code format;
    a mismatch-resolving-data generating unit that generates mismatch-resolving data in the common code format for resolving the data mismatch, with data that is included in either of the first and second data, based on at least one of a priority policy indicating priority data between the first and second databases and a data association table indicating data association between the first and second databases;
    a second code-format converting unit that converts the common code format of the generated mismatch-resolving data into the first and second code formats; and
    a database updating unit that reflects the mismatch-resolving data in the first and second code formats to the first and second databases respectively.

2. The data-mismatch resolving apparatus according to claim 1, wherein when at least one of a character code and number of columns is different between the first and second databases, the first code-format converting unit converts the code format of the extracted data into a code format formed with at least one of a common character code and a common number of columns.

3. The data-mismatch resolving apparatus according to claim 1, further comprising:
    a setting receiving unit that receives a setting for the priority policy and contents of the data association table from a user, wherein
    the mismatch-resolving-data generating unit generates the mismatch-resolving data based on at least one of the priority policy and the contents of the data association table received by the setting receiving unit.

4. A data-mismatch resolving method of resolving a data mismatch between a first database managed by a first management apparatus and a second database managed by a second management apparatus, the first database corresponding to the second database, the data-mismatch resolving method comprising:
    first code-format converting including
        extracting first and second data from the first and second databases respectively, the first data being in a first code format and the second data being in a second code format; and
        converting the first and second code formats of the extracted first and second data into a common code format;
    generating, using a processor, mismatch-resolving data in the common code format for resolving the data mismatch, with data that is included in either of the first and second data, based on at least one of a priority policy indicating priority data between the first and second databases and a data association table indicating data association between the first and second databases;
    second code-format converting including
        converting the common code format of the generated mismatch-resolving data into the first and second code formats; and
    reflecting the mismatch-resolving data in the first and second code formats to the first and second databases respectively.

5. The data-mismatch resolving method according to claim 4, wherein
    when at least one of a character code and number of columns is different between the first and second databases, the first code-format converting includes converting the code format of the extracted data into a code format formed with at least one of a common character code and a common number of columns.

6. The data-mismatch resolving method according to claim 4, further comprising:
    receiving a setting for the priority policy and contents of the data association table from a user, wherein
    the generating includes generating the mismatch-resolving data based on at least one of the priority policy and the contents of the data association table received.

7. A non-transitory computer-readable recording medium that stores therein a computer program for resolving a data mismatch between a first database managed by a first management apparatus and a second database managed by a second management apparatus, the first database corresponding to the second database, wherein
    the computer program causes a computer to execute:
        first code-format converting including
            extracting first and second data from the first and second databases respectively, the first data being in a first code format and the second data being in a second code format; and
            converting the first and second code formats of the extracted first and second data into a common code format;
        generating mismatch-resolving data in the common code format for resolving the data mismatch, with data that is included in either of the first and second data, based on at least one of a priority policy indicating priority data between the first and second databases and a data association table indicating data association between the first and second databases;

second code-format converting including
- converting the common code format of the generated mismatch-resolving data into the first and second code formats; and
- reflecting the mismatch-resolving data in the first and second code formats to the first and second databases respectively.

8. The non-transitory computer-readable recording medium according to claim 7, wherein
- when at least one of a character code and number of columns is different between the first and second databases, the first code-format converting includes converting the code format of the extracted data into a code format formed with at least one of a common character code and a common number of columns.

9. The non-transitory computer-readable recording medium according to claim 7, wherein
- the computer program further causes a computer to execute receiving a setting for the priority policy and contents of the data association table from a user, and
- the generating includes generating the mismatch-resolving data based on at least one of the priority policy and the contents of the data association table received.

* * * * *